Aug. 19, 1969  K. S. KAVTHEKAR  3,462,189
FLEXIBLE BACKLIGHT FLOW-THROUGH VENTILATION SYSTEM
Filed June 14, 1967  2 Sheets-Sheet 1

INVENTOR.
Keshav S. Kavthekar
BY
John R. Faulkner
John J. Roethel
ATTORNEYS.

Aug. 19, 1969  K. S. KAVTHEKAR  3,462,189
FLEXIBLE BACKLIGHT FLOW-THROUGH VENTILATION SYSTEM
Filed June 14, 1967  2 Sheets-Sheet 2

INVENTOR.
Keshav S. Kavthekar
BY John R. Faulkner
John J. Roethel
ATTORNEYS.

United States Patent Office 3,462,189
Patented Aug. 19, 1969

3,462,189
FLEXIBLE BACKLIGHT FLOW-THROUGH
VENTILATION SYSTEM
Keshav S. Kavthekar, Detroit, Mich., assignor to Ford
Motor Company, Dearborn, Mich., a corporation of
Delaware
Filed June 14, 1967, Ser. No. 645,938
Int. Cl. B60j 1/18, 9/04; B60h 1/24
U.S. Cl. 296—146                                    3 Claims

ABSTRACT OF THE DISCLOSURE

A flow-through ventilation system for a vehicle body in which a body window opening has a window closure of resilient semi-rigid or flexible strength glass positioned therein. An air outlet from the interior of the vehicle is created by flexing the window closure to space a marginal portion of the latter from the adjacent weather seal mounted in the body opening.

Background of the invention

The superiority of vehicle ventilation systems that utilize the rear window as an air exhaust outlet has become well established. Such systems exhibit characteristics of improved air circulation within the passenger compartment, positive control of the rate of air flow through the compartment, and a low noise level particularly when compared with systems that rely solely on pivoted ventilation windows in the front doors of the vehicle body for controlled air exhaust.

A number of mechanical systems are known in the prior art for opening the rear window to provide an air outlet for exhaust. The rear window may be hinged as shown in U.S. Patent 2,762,648, or the window may be installed to be lowered and raised as shown in U.S. Patent 2,997,337. Both of the patented systems require expensive, complicated and space-consuming mechanisms for moving the windows. Also, elaborate provisions must be made for guiding the window during its movements and for sealing the window when in closed position.

It is an object of the precent invention to provide a simplified system utilizing semi-rigid or flexible high strength glass constructed and arranged to be manipulated to present the desired air exhaust for outlet openings.

Brief summary of the invention

The present invention relates particularly to a flow-through ventilation system for a vehicle body structure having a rear window opening. The window opening is closed by a window closure or panel of resilient semi-rigid or flexible transparent material, such as the glass-like material known by the trade name Chemcor. The window closure or panel rests within the body opening on a weatherstrip or seal that provides weathertight integrity in closed condition. A lift means is coupled to an edge of the window closure or panel and is operative to separate a marginal portion of the closure or panel from the body structure by flexing the closure or panel material into an arch-shaped opening.

Brief description of the drawings

Other objects, advantages and features of the present invention will be made more apparent as this description proceeds, reference being had to the accompanying drawings, wherein.

Description of the preferred embodiment

Figure 1:
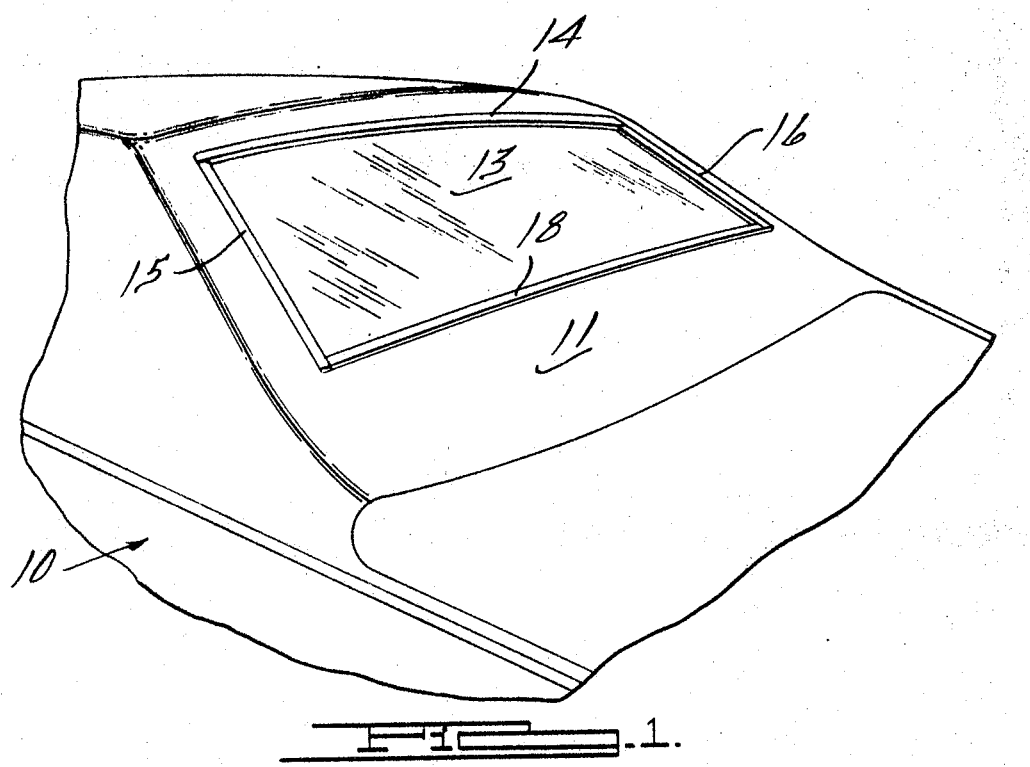
FIG. 1 is a fragmentary perspective view of the rear portion of the vehicle body passenger compartment having a window opening, the window being shown in the closed position in the opening.
Figure 2:
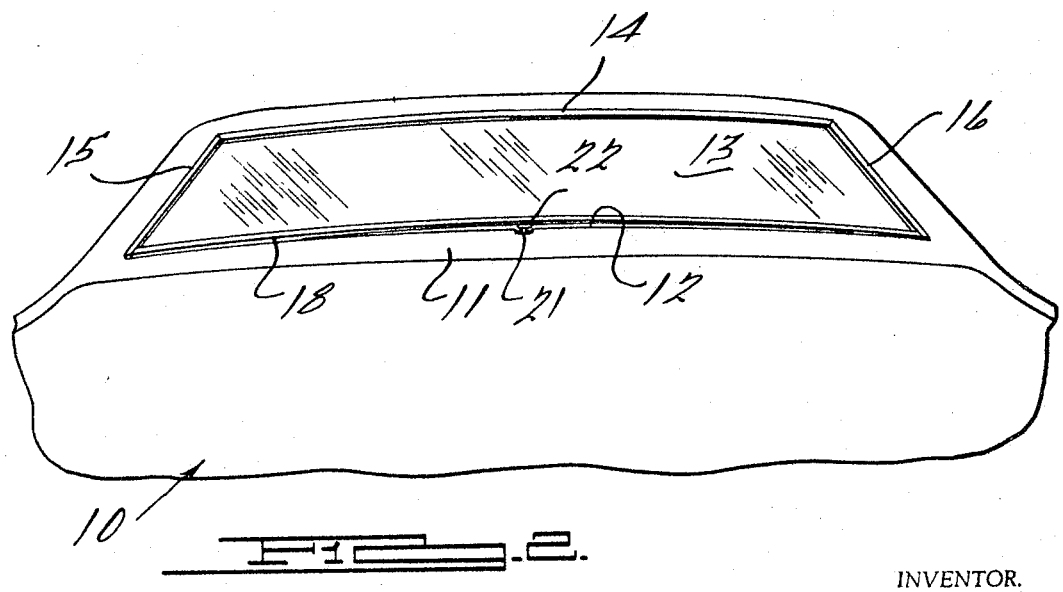
FIG. 2 is a fragmentary perspective view of the vehicle body structure rear portion wiith the lower edge of the window being shown in an arched open condition.
Figure 3:
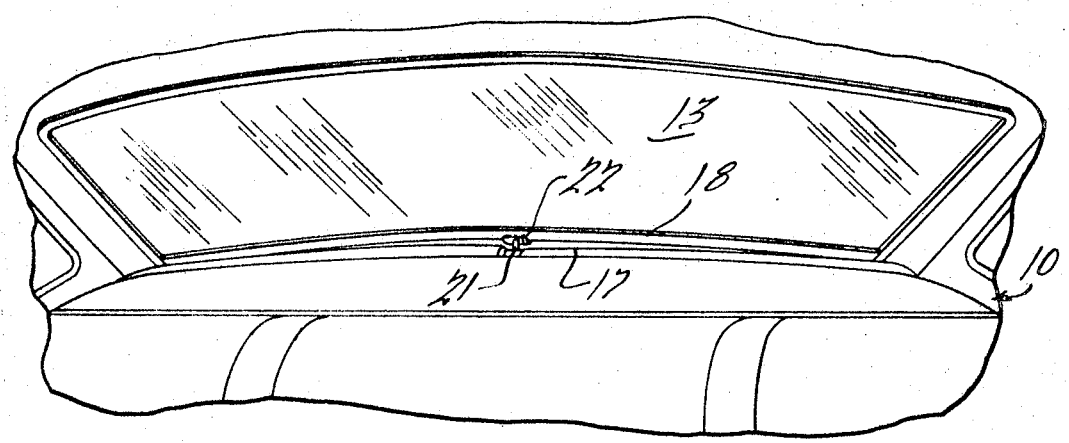
FIG. 3 is a view of the rear window opening as it appears looking out from the inside of the vehicle passenger compartment.

Referring to the drawings, there is illustrated a fragmentary portion of a vehicle body, generally designated 10. The vehicle body 10 has a rearwardly sloping body panel 11 having a conventional window opening 12 therein. The window opening 12 is adapted to be closed by a window panel 13 which, in the present instance, is a semi-rigid flexible transparent panel made of a material known as Chemcor, a flexible high strength safety glass.

The panel 13 rests in the body opening 12 at its upper edge and two side edges on conventional weatherstripping or sealing strips (not shown). The panel 13 is retained against the top and side weatherstrips by conventional reveal moldings, a top reveal molding 14 and side reveal moldings 15 and 16, respectively.

The bottom edge of the window opening 12 has a weatherstrip 17 which preferably is somewhat more resilient than the conventional side and top weatherstrips. The lower edge of the glass panel 13 is protected by a flexible channel strip 18.

When the glass panel 13 is in the position shown in FIG. 1, it has the appearance of a conventional rear window having complete weathertight integrity on all sides. To achieve flow-through ventilation from the vehicle passageway, the panel 13 is flexed by bodily lifting the lower edge from the weatherstrip 17. This is done by exerting a lift force on the panel at substantially the lower edge midpoint. The lift force causes the lower edge portion to arch away from the weatherstrip creating a flow-through opening.

Figure 4:
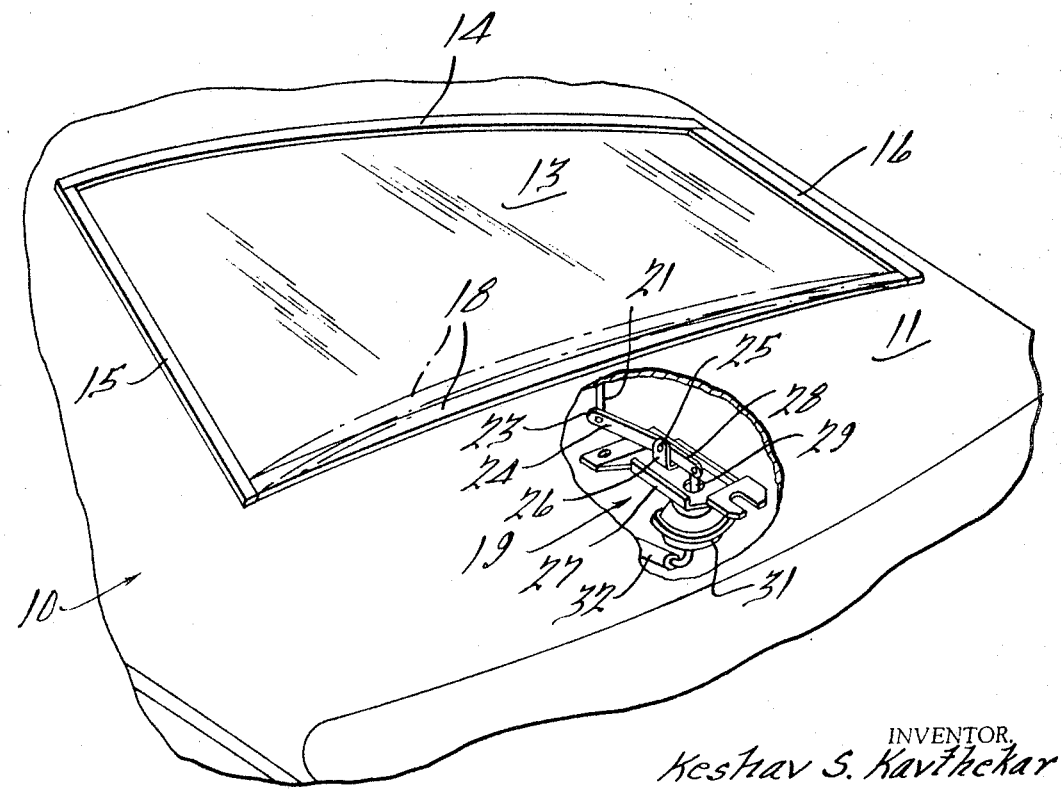
FIG. 4 is a fragmentary perspective view illustrating an exemplary mechanism for opening the window as shown in FIGS. 2 and 3.

An exemplary lift mechanism is shown in FIG. 4. This lift mechanism, generally designated 19, comprises a push-pull rod 21 clamped at its upper end 22 to the lower edge channel 18 of the glass panel 13. The push-pull rod 21 is coupled to one end 23 of a bellcrank lever 24 pivoted intermediate its end at 25 to a bracket 26 carried on a mounting plate 27 secured in any convenient manner to a body structural member (not shown). The other end 28 of the lever 24 is coupled to a rod 29 shiftable by a motor means 31. The motor means 31 may be a double acting solenoid or, as illustrated, a vacuum motor coupled by a vacuum hose 32 to a suitable instrument panel mounted control device (not shown).

Actuation of the motor means 31 to raise the push-pull rod 21 causes the window lower edge to arch to form the flow-through air exhaust opening between it and the body lower window opening edge. Reverse action of the motor means causes the lower edge of the window to be pulled down into sealing contact with the lower weatherstrip 17.

It has been determined that very little end movement of the glass panel 13 occurs. The movement that does occur is well within the tolerance limits provided so that the weathertight integrity of the side edges of the panel beneath the reveal moldings 15 and 16 is unimpaired. Little effect of the arching of the lower edge of the glass panel 13 is noticed along its upper edge.

It will be understood that this invention is not to be limited to the exact construction shown and described but that various changes and modifications may be made

I claim:

1. In a vehicle body structure having a rear portion containing a window opening,
   a window panel of flexible high strength glass in said opening,
   retention means located at the top and each side of said opening retaining said panel at the marginal portions of the corresponding three sides thereof in said window opening,
   a resilient weatherstrip located at the bottom of said opening against which the marginal portion of a fourth side of said panel abuts when in closed position,
   and drive means coupled to said panel to arch the marginal portion of said panel fourth side out of contact with said weatherstrip to provide an air outlet from the interior of the vehicle body to the atmosphere.

2. In a vehicle body structure according to claim 1, in which,
   the bottom marginal portion of the window panel is protected by a channel-shaped moulding, and
   the drive means comprises a push-pull rod coupled to the channel-shaped moulding intermediate the ends of the latter,
   said push-pull rod being operatble by a motor means to exert a lifting force on the lower edge of the moulding to cause the latter to assume the arched separation of the panel from the weatherstrip.

3. In a vehicle body structure according to claim 1, in which,
   the drive means comprises a push-pull rod coupled to the lower edge of the window panel intermediate the sides of the latter,
   and motor means coupled to said push-pull rod to cause the latter to exert a lifting force on the lower edge of the panel to force the panel to assume the arched separation from the weatherstrip.

References Cited

UNITED STATES PATENTS

| 3,214,213 | 10/1965 | Hezler | 296—107 |
| 2,436,728 | 2/1948 | Parsons | 296—146 |

PHILIP GOODMAN, Primary Examiner

U.S. Cl. X.R.

98—2